US006520070B1

(12) United States Patent
Heczko

(10) Patent No.: US 6,520,070 B1
(45) Date of Patent: Feb. 18, 2003

(54) FOOD PACKAGING AND PREPARATION SYSTEM UTILIZED THEREWITH

(76) Inventor: James Heczko, 3512 Manhattan Ave., Manhattan Beach, CA (US) 90266

( * ) Notice: Subject to any disclaimer, the term of this patent is extended or adjusted under 35 U.S.C. 154(b) by 0 days.

(21) Appl. No.: 09/639,969

(22) Filed: Aug. 16, 2000

(51) Int. Cl.⁷ .................................................. A47J 31/00
(52) U.S. Cl. ........................ 99/323.3; 99/307; 99/316; 426/113; 426/115; 426/431
(58) Field of Search ........................ 99/306, 307, 308, 99/304, 323.3, 323, 321, 319, 322, 318, 313, 314, 316, 315; 426/106, 112, 113, 114, 115, 425, 431; 219/429, 432, 433

(56) References Cited

U.S. PATENT DOCUMENTS

| | | | |
|---|---|---|---|
| 1,136,776 A | 4/1915 | Collins | |
| 1,224,778 A | 5/1917 | Palm | |
| 1,504,500 A | 8/1924 | Pizzoglio | |
| 1,632,342 A | 6/1927 | Lambert | |
| 1,952,752 A | * 3/1934 | Haines | 99/308 |
| 2,102,244 A | * 12/1937 | Walsh | 99/308 |
| 2,164,399 A | * 7/1939 | Granger | 99/308 |
| 2,455,660 A | 12/1948 | Dunlop | 99/308 |
| 2,550,034 A | 4/1951 | Allen | 215/11 |
| 2,550,902 A | * 5/1951 | Beckelman | 99/308 |
| 2,876,113 A | 3/1959 | Barton | |
| 3,119,694 A | 1/1964 | Gauld | 99/295 |
| 3,270,659 A | 9/1966 | Tavera | 99/295 |
| 3,487,989 A | 1/1970 | Rausing et al. | |
| 3,527,153 A | 9/1970 | Orlando | 99/315 |
| 3,602,386 A | 8/1971 | Brime et al. | |
| 3,696,733 A | * 10/1972 | Beverett | 99/307 |
| 3,784,039 A | 1/1974 | Marco | |
| 4,227,362 A | 10/1980 | Wallsten | |
| 4,487,114 A | 12/1984 | Abdenour | 99/295 |
| 4,803,088 A | 2/1989 | Yamamoto et al. | 426/107 |
| 4,805,799 A | 2/1989 | Robbins, III | 220/403 |
| 4,869,912 A | 9/1989 | McCoy et al. | 426/123 |
| 4,883,935 A | 11/1989 | Fairchild et al. | |
| 4,895,264 A | 1/1990 | Phlaphongphanich | 215/11.1 |
| 4,908,222 A | 3/1990 | Yu | 426/241 |
| 4,981,588 A | 1/1991 | Poulallion | 210/474 |
| 5,072,661 A | 12/1991 | Kondo | 99/296 |
| 5,079,396 A | 1/1992 | Katz et al. | |
| 5,104,666 A | 4/1992 | Sanvitale | 426/77 |
| 5,132,124 A | 7/1992 | Tamaki et al. | 426/82 |
| 5,178,294 A | 1/1993 | Hill et al. | 220/469 |
| 5,300,308 A | 4/1994 | Louridas | 426/112 |
| 5,309,823 A | 5/1994 | Allen | 99/295 |
| 5,368,183 A | 11/1994 | Singer | 220/528 |
| 5,385,251 A | 1/1995 | Dunn | 215/11.3 |
| 5,424,083 A | 6/1995 | Lozito | 426/82 |
| 5,636,871 A | 6/1997 | Field | 383/33 |
| 5,738,786 A | 4/1998 | Winnington-Ingram | 210/474 |
| 5,806,408 A | 9/1998 | Debacker et al. | 99/295 |
| 5,840,189 A | 11/1998 | Sylvan et al. | 210/474 |
| 5,913,964 A | 6/1999 | Melton | 99/322 |
| 5,948,455 A | 9/1999 | Schaeffer et al. | 426/77 |

\* cited by examiner

Primary Examiner—Reginald L. Alexander

(57) ABSTRACT

A food preparation system comprising a container having a prescribed quantity of foodstuff. The container includes an interior chamber expandable by the addition of a liquid. The food preparation system further comprises a vessel sized and configured to receive the container and a prescribed volume of liquid. A pump is in fluid communication with the liquid and the container. The pump is operative to transfer the liquid from the vessel into the container such that as the foodstuff is mixed with the liquid, the interior of the container will expand into the vessel.

14 Claims, 4 Drawing Sheets

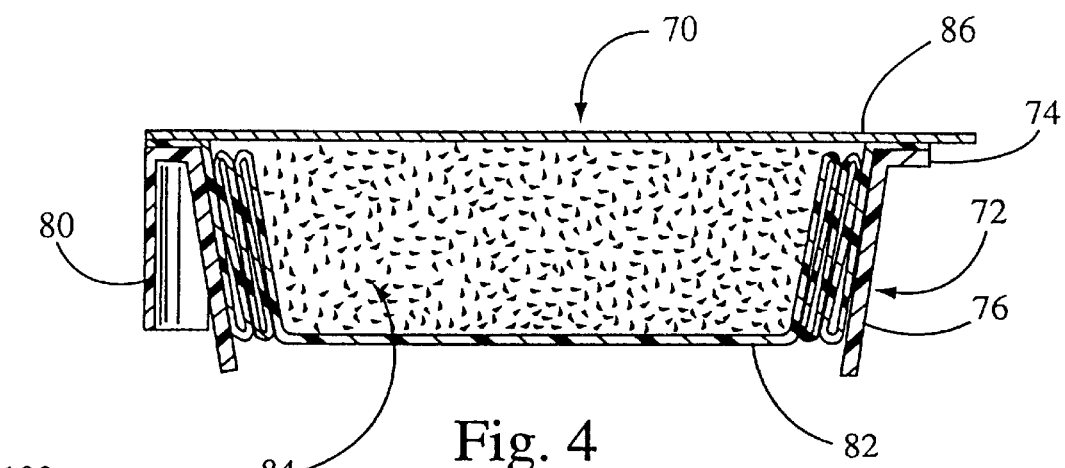
Fig. 4
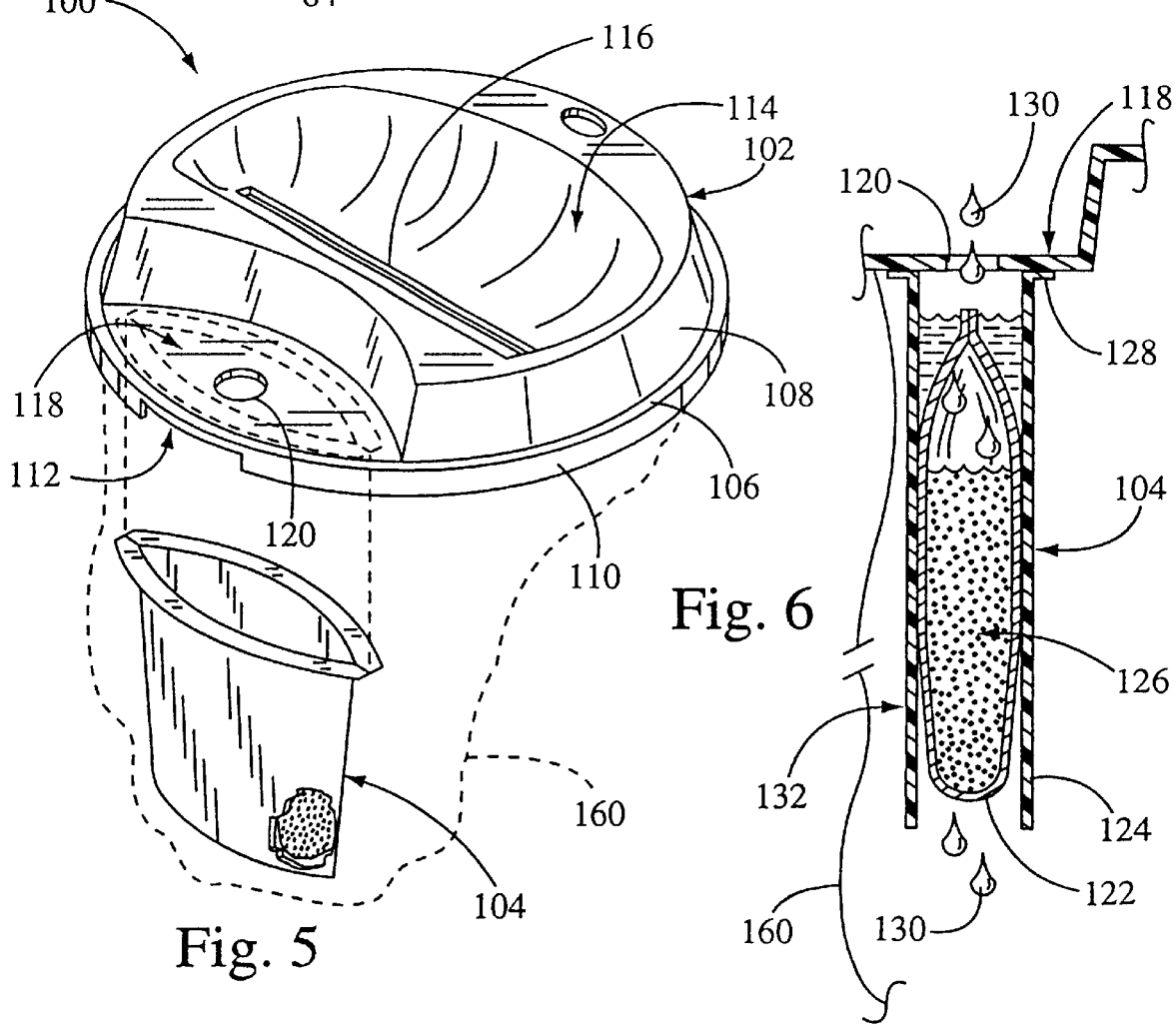
Fig. 5
Fig. 6

FOOD PACKAGING AND PREPARATION SYSTEM UTILIZED THEREWITH

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to the packaging and preparation of dehydrated foods and beverage infusions, and more particularly to a system for the packaging and preparation of dehydrated foods and beverage infusions.

Dehydrated packaged foods are a quick and easy way for people on-the-go to eat. Typically, such dehydrated packaged foods consist of dried foodstuff contained within a packet or a disposable paper cup. In the case of the packet, the dried foodstuff is re-hydrated by emptying the packet into a vessel such as a mug or bowl and adding a prescribed volume of hot water to such vessel. In the case of the paper cup the dried foodstuff is re-hydrated with a prescribed volume of heated water poured into the container. In both cases, the hot water is mixed with the dried foodstuff and allowed to steep until the meal is ready to eat.

Dehydrated packaged foods usually have an extended shelf life because the foodstuff has been dried and hermetically sealed within the packet or paper cup. Packets and paper cups are convenient in that they provide the consumer with a pre-measured quantity of foodstuff which facilitates the preparation of a single serving or some other convenient serving size.

Dehydrated foods packaged in paper cups are particularly popular because the meal comes in its own serving container. In this respect, the consumer only needs to provide hot water and a spoon in order to eat the meal from the cup.

While convenient in many regards, paper cup packages offer several disadvantages. The paper cup must be of a size which can contain the dried foodstuff, as well as the liquid to re-hydrate the same. Therefore, paper cup packages typically have approximately two to three times the volume as the dried foodstuff contained therein. Accordingly, when packaged, the dried foodstuff will only occupy a small portion of the cup, while the remainder of the cup will be empty. Such partially empty cups are structurally weaker than substantially full containers and are prone to crushing and bursting. Moreover, since the paper cup packaging contains mostly air, it consumes valuable shelf space and is excessively bulky during shipping and storage. Their thin paper walls provide little insulation and, once hot water is added into the cup, they are uncomfortably hot to hold. Moreover, the walls of such cups are prone to bending under the pressure of a consumer's grip, rendering them difficult to handle and easy to spill.

Dehydrated foods packaged in packets also offer a trade-off between positive and negative features. Packets are compact and sturdy. They are typically used in conjunction with a mug, cup or bowl, which offers the consumer a sturdy and comfortable vessel from which to consume the prepared foodstuff. Packets are inconvenient in that they require the procurement of a vessel to prepare the substance. Packets require handling in order to pour the contents of the packet into the vessel. In addition, use of a packet requires that the vessel be cleaned before and/or after it is used for the foodstuff.

To use either a paper cup package or a packet, the consumer of dehydrated foods will need to provide hot water in order to prepare the meal. Specifically, most packaged foods need hot water to mix with and fully cook the dried foodstuff. The hot water is poured over the dried foodstuff such that the dried foodstuff is re-hydrated and heated thoroughly. Most manufactures of packaged food recommend that the hot water be heated first before being mixed with the dried foodstuff. Accordingly, most users of the dehydrated food use either a microwave oven to heat the water in a separate container or use a saucepan to heat the water over a stove. This defeats the overall utility of the packaged food inasmuch as the separate container used to heat the water must be procured and cleaned. Furthermore, the consumer must spend time measuring, pouring and otherwise handling heated and unheated water. Additionally, the consumer of the packaged food must be near a source of hot water and/or a method of heating water. For consumers who need a meal on the go (e.g., salesmen working out of their automobiles), it is often inconvenient to find a source of heated water. For consumers that have little space (e.g. students in a dormitory and workers in an office or cubicle), it is often impractical to possess a microwave oven or stove.

Beverage infusions such as coffee are commonly prepared using an automatic drip coffee maker. To brew coffee in such devices, a consumer typically engages in a multi-step process that includes, inserting a filter into the coffee maker, measuring and adding ground coffee to the filter, measuring and adding a quantity of water to the machine and turning on the machine. After the machine has competed a coffee brewing cycle, the consumer decants the coffee from the carafe of the coffee maker into a separate vessel such as a cup or mug. After consuming the coffee, the consumer must clean-up by disposing of the spent coffee grounds and filter, cleaning the carafe and other portions of the coffee maker and cleaning the vessel used to consume the coffee. Overall, the process of making coffee using an automatic drip coffee maker requires a significant time and effort on behalf of the consumer. Moreover, the amount of time and effort required to prepare a single cup of coffee using such devices is comparable to the time and effort required to prepare an entire pot of coffee. Numerous products have been developed in an effort to facilitate the preparation of a single cup of coffee, including instant coffee and coffee bags. While instant coffee is convenient in many respects, it has a taste and composition that is different and generally considered inferior to that of brewed coffee. Coffee bags have been developed that resemble tea bags in their use. However, unlike tea which readily infuses into hot water with minimal agitation, coffee is best produced by a forced extraction process in which a moving stream of hot water percolates through coffee grounds. Since coffee bags do not provide for a forced flow of water over the coffee grounds, they typically result in an extremely weak brew. In addition, both instant coffee and coffee bags require hot water which is often inconvenient to obtain. Moreover, both instant coffee and coffee bags require the use of a vessel such as a mug or cup which will need to be cleaned after use.

The present invention addresses the above-mentioned deficiencies in the prior art. Specifically, the present invention provides a container for dehydrated foods that:

is compact;

is sturdy;

permits preparation of the dehydrated food within the package;

can be utilized in conjunction with a common cup or mug; and requires minimal clean-up.

In addition, the present invention provides a package for coffee that:

facilitates the quick preparation of coffee;

includes the pre-measured quantity of coffee grounds and filter requisite to brew said coffee;

provides for the brewing of coffee;

provides for the consumption of the coffee directly out of the package; and requires minimal clean-up.

Finally, the present invention provides an appliance for use with said packages for food and coffee that;

is compact;

is simple to use;

prepares said foodstuff or coffee within said packages;

permits consumption of said foodstuff or coffee directly out of said packages;

requires no additional containers or vessels for its use; and requires minimal clean-up following its use.

In these respects, the food packaging and preparation of the present invention provides a novel system of packaging and preparing food and coffee for busy consumers.

BRIEF SUMMARY OF THE INVENTION

A food preparation system comprising a vessel configured to receive a prescribed volume of liquid and a container sized to be insertable into the vessel. The container includes a prescribed quantity of foodstuff contained therein. The food preparation system further comprises a pump in fluid communication with the liquid and the container wherein the pump is operative to transfer the liquid from the vessel into the container in order to mix with the foodstuff. In the preferred embodiment, the container comprises an expandable chamber that will enlarge when the volume of liquid is transferred therein. Typically, the liquid is transferred from the pump into the containers via a tube which is inserted into the container. The pump may be a hand pump (not shown) or percolator. If the pump is a percolator then the pump will comprise a heating element in fluid communication with the liquid and the tube of the pump. The heating element is operative heat the fluid such that it will percolate into the expandable chamber of the container and mix with the foodstuff.

The vessel is configured with a top portion that receives the container and a bottom portion which is configured to receive the prescribed volume of liquid. In this respect, as liquid is pumped from the bottom portion into the chamber of the container, the chamber will expand into the bottom portion of the vessel. In the preferred embodiment, the liquid contained within the vessel is water which will mix with the foodstuff in order to provide a meal. Typically, the vessel will define a mouth on the top portion thereof such that the container will engage the mouth when inserted within the vessel. Additionally, the container may comprise a lip which will cover the lip of the vessel in order to minimize cleaning thereof.

The food preparation system may comprise an inner cup which is insertable into the interior of the vessel. If the food preparation system includes an inner cup, then the container having a prescribed quantity of foodstuff is insertable into the inner cup. Accordingly, liquid contained within the vessel will be pumped from the vessel into the container such that the liquid will be mixed with the foodstuff. Alternatively, the inner cup may include a valve such that when the inner cup is inserted into the vessel, any liquid poured into the inner cup will flow into the interior chamber of the vessel and be pumped into the container. As the expandable chamber of the container enlarges due to the flow of liquid therein, the chamber will expand into the inner cup.

In accordance with the present invention there is provided a method of preparing packaged food with a food preparation system having a container with a prescribed quantity of foodstuff and a vessel with a pump. The method comprises filling the vessel with a prescribed volume of liquid. Next, the container is inserted into the vessel and liquid is transferred from the vessel into the container with the pump in order to mix the liquid with the foodstuff. In order to transfer the liquid from the vessel into the container, the liquid will be heated to percolate into the container. Accordingly, the container will expand into the vessel as the liquid is transferred.

BRIEF DESCRIPTION OF THE SEVERAL VIEWS OF THE DRAWING

These as well as other features of the present invention will become more apparent upon reference to the drawings wherein:

FIG. 4 is a cross-sectional view of the food container shown in FIG. 3;

FIG. 5 is a perspective view of a coffee container for use with the system shown in FIG. 1;

FIG. 6 is a cross-sectional view of the coffee container shown in FIG. 5;

DETAILED DESCRIPTION OF THE INVENTION

Figures 1, 3:
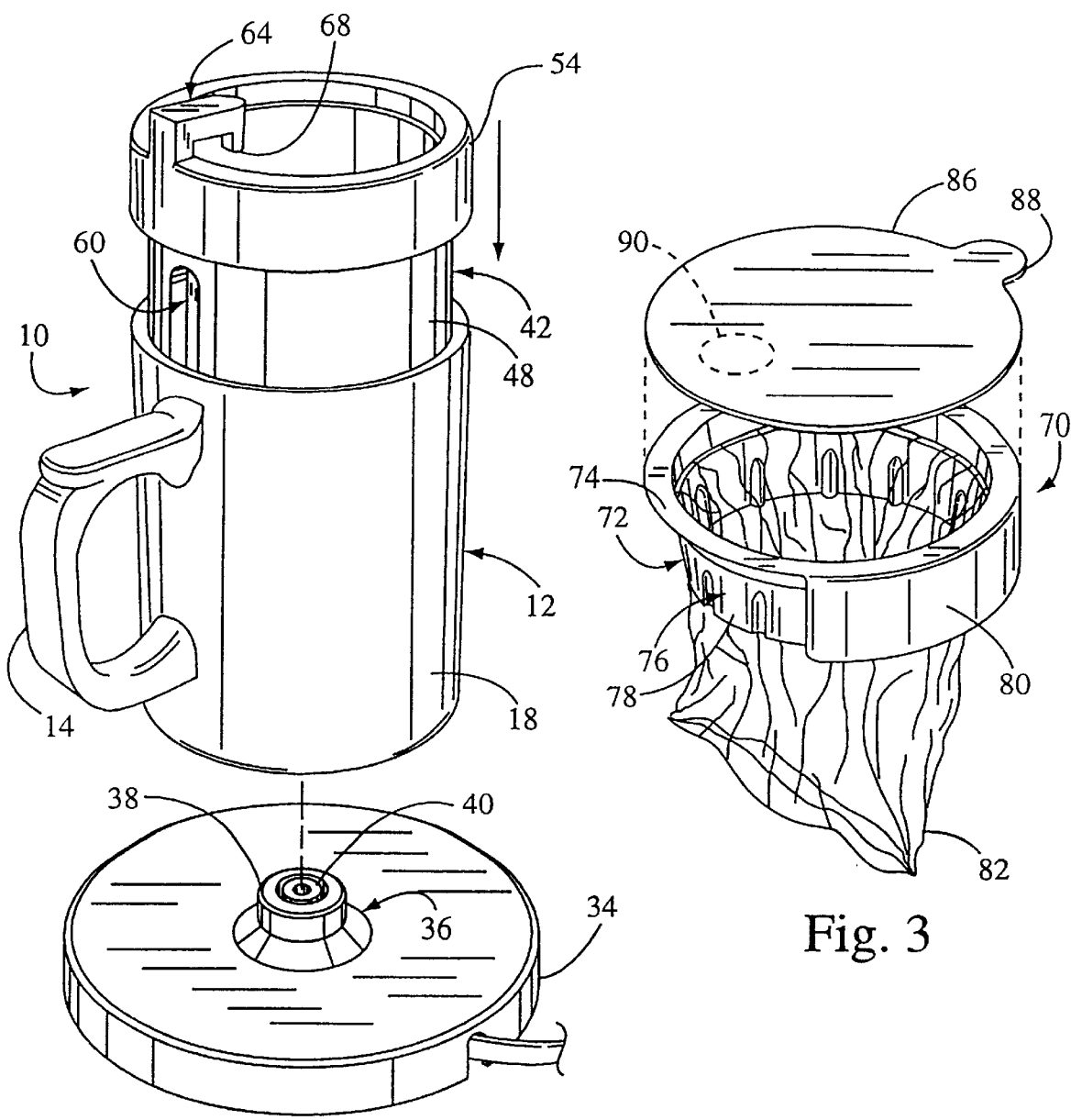
FIG. 1 is a perspective view of the food packaging and preparation system constructed in accordance with the present invention.
FIG. 3 is a perspective view of a food packaging container used in conjunction with the system shown in FIG. 1.
Figure 2:
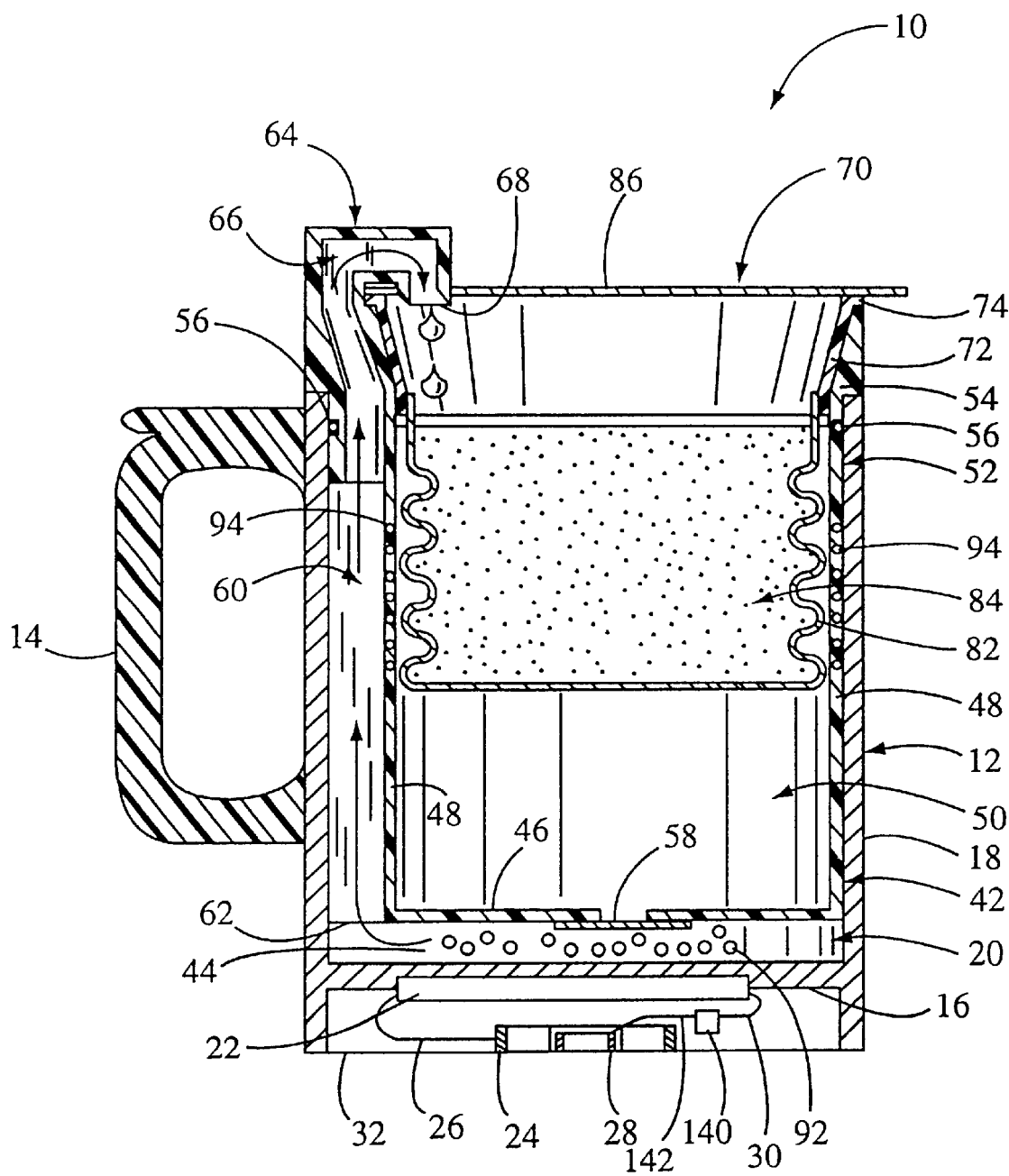
FIG. 2 is a cross-sectional view of the system shown in FIG. 1.

Referring now to the drawings wherein the showings are for purposes if illustrating a preferred embodiment of the present invention only, and not for purposes of limiting the same, FIG. 1 perspectively illustrates a food preparation system 10 constructed in accordance with the present invention. The food preparation system 10 consists of a vessel or outer cup 12 having a handle 14. The outer cup 12 may be insulated in order to retain heat, as will be further explained below. Referring to FIG. 2, the outer cup 12 has a base portion 16 and a generally cylindrical side wall 18 attached thereto. The side wall 18 and base portion 16 define an interior chamber 20 of the outer cup 12. It will be recognized by those of ordinary skill in the art that the outer cup 12 does not necessarily need to be cylindrical as shown in the drawings, but can be any shape desired. The interior chamber 20 formed by the attachment of the base portion 16 to the side wall 18 forms a water-tight enclosure which is configured to contain a volume of fluid, as will be further explained below.

Disposed on a bottom side of the base portion 16 is a heating element 22 such as a wire coil. The heating element 22 is operative to transfer heat therefrom to the base portion 16 and any liquid contained within interior chamber 20 of outer cup 12. Accordingly, the heating element 22 is in electrical communication with a first contact 24 through a first wire 26. The heating element 22 is in electrical communication with a thermostatic switch 140 via a second wire 30. The thermostatic switch 140 is operative to permit electrical flow when the thermostatic switch 140 is below a specified temperature and to prevent electrical flow when the thermostatic switch is above a specified temperature, as is further explained below. The thermostatic switch 140 is in electrical communication with a second contact 28 via a third wire 142. Thus, when the thermostatic switch 140 is below said specified temperature, the first and second contacts 24, 28, as well as the first, second and third wires 26, 30, 142 are operative to transfer electrical energy to the heating element 22 such that the heating element 22 will undergo a rise in temperature. The first and second contacts 24, 28 are disposed within a bottom wall 32 of the outer cup 12 that is attached to side wall 18.

In order to provide electrical energy to the first an second contacts 24, 28, the food preparation system 10 includes a base 34, as seen in FIG. 1. The base 34 supports the outer cup 12 and includes a plug 36 for receipt of the first and second contacts 24, 28. In this respect, the plug 36 includes a outer contact 38 which will abut the first contact 24 when the outer cup 12 is placed on base 34. Similarly, the plug 36 includes an inner post 40 which is engageable to the second contact 28 of the outer cup 12. Accordingly, it is possible to transfer electrical energy to the heating element 22 with plug 36 when the outer cup 12 is placed on base 34.

In the preferred embodiment of the food preparation system 10, an inner cup 42 is provided. The inner cup 42 is sized slightly smaller than the diameter of the interior chamber 20. In this respect, the inner cup 42 is insertable into the outer cup 12, as seen in FIG. 2. It will be recognized the inner cup 42 will generally have the same shape as the interior chamber 20 such that the inner cup 42 will be insertable therein. Typically, the inner cup 42 will have a longitudinal length that is smaller than that of the interior chamber 20, as will be further explained.

As seen in FIG. 2, the inner cup 42 includes a wall 48 attached to a bottom 46. In this respect, the bottom 46 and wall 48 of inner cup 42 define a hollow interior 50. Disposed on an upper portion 52 of inner cup 42 is a lip 54. As seen in FIG. 1, the lip 54 protrudes outwardly from the inner cup 42 such that lip 54 is substantially flush with the outer cup 12 when the inner cup 42 is inserted therein. The lip 54 is integrally connected to the wall 48 and supports the inner cup 42 within outer cup 12. The lip 54 maintains the inner cup 42 in a position whereby a liquid heating chamber 44 is defined between the bottom 46 of inner cup 42 and base portion 16 and sidewall 18 of outer cup 12.

The inner cup 42 is sized such that an outer surface of the wall 48 thereof will be in abutting contact with an inner surface of side wall 18 of the outer cup 12. Furthermore, the inner cup 42 includes an annular sealing member 56 disposed around the wall 48 at a location near an upper portion 52 thereof. Specifically, a groove or notch will be formed in the outer surface of the wall 48 such that sealing member 56 may be placed therein. The sealing member 56 is preferably fabricated from a compressible rubber material and forms a water tight seal between the outer surface of the wall 48 for inner cup 42 and the inner surface of sidewall 18 for the outer cup 12.

The inner cup 42 further includes a valve 58 disposed within bottom 46, as seen in FIG. 2. The valve 58 is operative to allow liquid contained within interior 50 of inner cup 42 to flow into liquid heating chamber 44. However, as will be further explained below, the valve 58 will prevent fluid within liquid heating chamber 44 from flowing back into interior chamber 50, as will be necessary during the transferring of the liquid.

Figure 7:
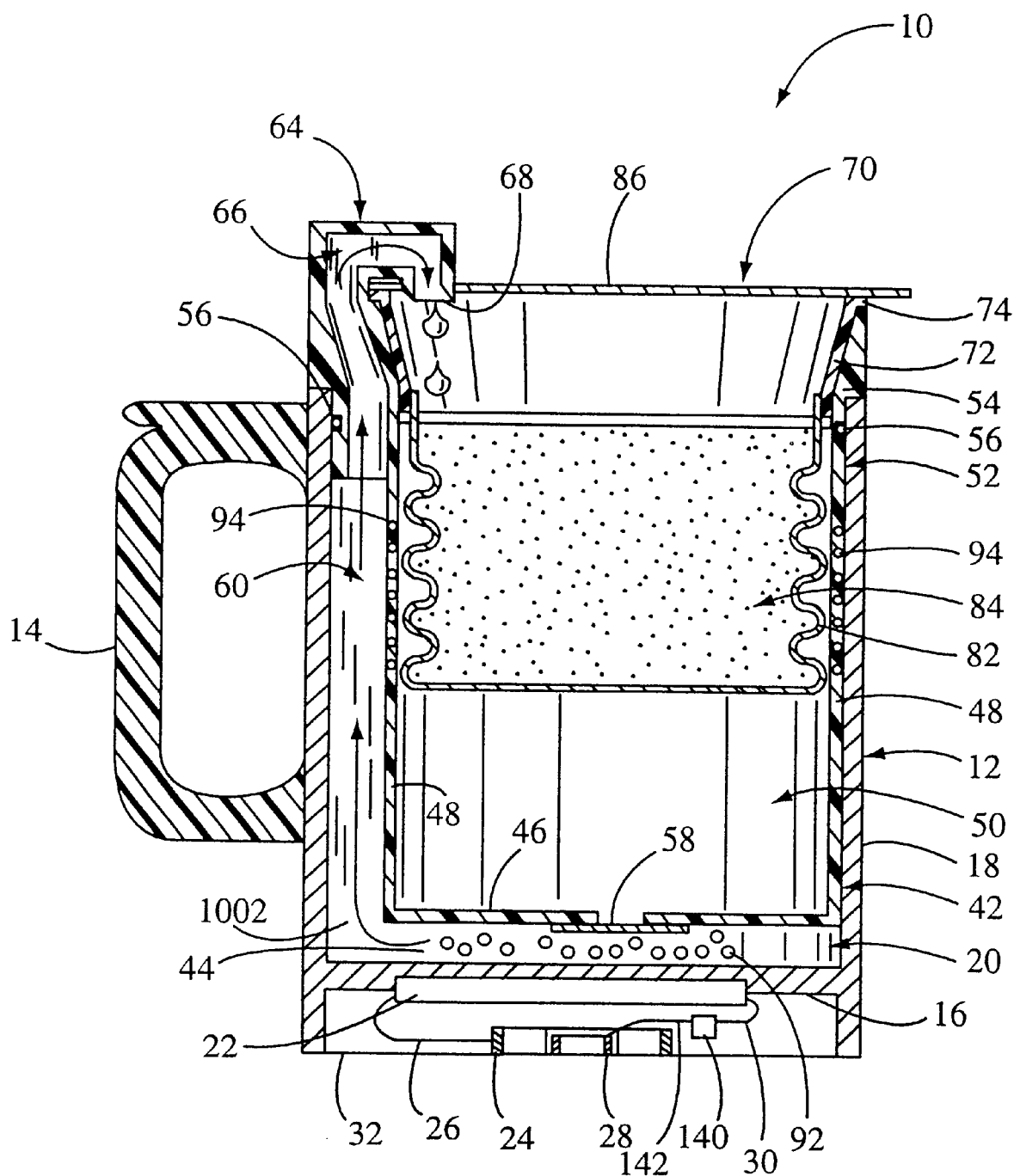
FIG. 7 is a cross-sectional view of a percolator incorporated into the food packaging and preparation system of the present invention.

In the preferred embodiment of the present invention, the inner cup 42 is formed with a groove 60 formed within wall 48. The groove 60 extends longitudinally along the length of the inner cup 42, as seen in FIG. 2. The groove 60 extends to the bottom of inner cup 42 such that the groove 60 is in fluid communication with liquid heating chamber 44. Accordingly, the groove 60 permits liquid within liquid heating chamber 44 to be transferred upwardly between the outer surface of the inner cup 42 and an inner surface of the outer cup 12. As will be recognized by those skilled in the art, the liquid may be transferred by any of a variety of well-known mechanisms, including but not limited to, either a hand-pump (not shown) or percolator such as 1002 depicted in FIG. 7 which motivates water to rise through groove 60 and be deflected downwardly as shown.

In fluid communication with the groove 60 is a discharge tube 64. In the preferred embodiment, the discharge tube 64 is integrally formed with lip 54. The discharge tube 64 is fluidly connected to the groove 60 and includes an interior passageway 66 for fluid from groove 60 to flow therethrough. As seen in FIG. 2, the discharge tube 64,has a generally L-shaped configuration such that an opening 68 of the discharge tube 64 is disposed above the opening of the inner cup 42. In this respect, the discharge tube 64 will direct liquid downwardly into the interior 50 of inner cup 42.

In the preferred embodiment of the food preparation system 10, a food container 70 is insertable into the interior 50 of the inner cup 42. Specifically, as seen in FIG. 3, the food container 70 comprises a support member 72 sized slightly smaller than the interior diameter of the inner cup 42. The support member 72 has a flange 74 circumferentially attached to an upper portion thereof. The flange 74 extends outwardly from the support member 72 and will come into abutting contact with the lip 54 of inner cup 42. In this respect, the flange 74 will maintain the food container 70 at the upper portion 52 of inner cup 42.

The support member 72 further includes a generally cylindrical skirt 76-which is sized smaller than the interior of the inner cup 42. Specifically, the skirt 76 is insertable into the interior 50 of the inner cup 42 and will be in abutting contact with the interior side of wall 48. The skirt 76 is integrally connected to the flange 74 and is maintained at the upper portion 52 of the inner cup 42. The skirt 76 includes a series of protrusions 78 which are in abutting contact with wall 48 of inner cup 42 when inserted therein. Specifically, the protrusions 78 frictionally retain the support member 72 within the inner cup 42 and inhibit movement of the food container 70.

As seen in FIGS. 3 and 4, the support member 72 further includes a lip 80 projecting downwardly from the flange 74. The lip 80 is integrally formed on the support member 72 and sized to cover a portion of the outer side of sidewall 18 of outer cup 12. Specifically, the lip 80 covers the outside portion of the outer cup 12 where a user would contact outer cup 12 when drinking. Accordingly, the lip 80 provides a contact surface for the user during drinking with the food preparation system 10, as will be further explained.

The food container 70 further includes a bag 82 attached to support member 72, as seen in FIGS. 3 and 4. Typically, the bag 82 is formed from a pliable plastic material which can be folded. As seen in FIG. 4, the bag 82 is attached to the flange 74 and skirt 76 of support member 72. However, it will be recognized that the bag 82 may be attached to any portion of the support member 72, or may be integrally formed from support member 72. The bag 82 is formed to contain a prescribed quantity of foodstuff 84, as seen in FIG. 4. The foodstuff 84 can be a dried food product which, when re-hydrated with water, forms a snack or meal. Some examples of the foodstuff 84 include soup mixes, pastas, and hot cereals. As seen in FIG. 4, the bag 82 is folded upon itself such that the foodstuff 84 fully occupies the interior space formed by the support member 72. As previously mentioned, a liquid such as water is typically added to the foodstuff 84 to prepare the same. In this respect, the bag 82 has an expanded interior volume which is sized to contain both the foodstuff 84 as well as the liquid to re-hydrate the same. Therefore, when liquid is added to the foodstuff 84, the folds in the bag 82 will come out thereby enlarging the interior size of the bag 82. As seen in FIG. 4, the folds of the bag 82 are disposed along an interior surface of the skirt 76. However, it will be recognized by those of ordinary skill in the art, that other folding arrangements are possible such as arranging the folds along the bottom of the bag 82 or even folding the bag 82 into a spiral fold whereby the folds of the spiral will be removed upon addition of a liquid.

In order to protect the contents (i.e., foodstuff 84) of the food container 70, a sealing sheet 86 is provided. The sealing sheet 86 covers the open end of the bag 82, as well as the open portion of the support member 72. As seen in FIG. 4, the bag 82 is attached to a top surface of the flange 74 and the sealing sheet 86 is attached to a top surface thereof. However, as previously explained, the bag 82 does not necessarily be attached to flange 74 such that sealing sheet 86 may be attached directly to a top surface of flange 74. The sealing sheet 86 prevents contaminants from polluting the food stuff 84, as well as preventing air from spoiling foodstuff 84. Accordingly, the sealing sheet 86 hermetically seals the foodstuff 84 within the food container 70. Because the foodstuff 84 is hermetically sealed within food container 70, the bag 82 will not expand when folded. Therefore, the food container 70 may be placed on the shelves of a retailer for sale, yet consume less space than the prior art packaged food mix because the food container 70 contains only foodstuff 84 and will expand upon the addition of liquid.

As seen in FIG. 3, the sealing sheet 86 includes a tab 88 for removal of the sealing sheet 86 from support member 72. Typically, the tab 88 extends outwardly from the flange 74 such that it may be gripped by the fingers of a consumer. Additionally, the sealing sheet 86 includes a perforated cut-out 90 which is removed for the addition of liquid into the bag 82. Specifically, with the sealing sheet 86 remaining on the support member 72, the cut-out 90 is punched out for adding liquid into the bag 82. By leaving the sealing sheet 86 on the support member 72, the, steam and heat from the hot liquid will be trapped with the foodstuff 84. Accordingly, the sealing sheet 86 facilitates preparation of the foodstuff 84 by retaining steam and heat therein.

Those of ordinary skills in the art will recognize that secondary packaging elements may enhance the utility of the above-described container. For example, a cup or wrapper (not shown) may be provided that attaches to support member 72 such that it covers skirt 76 and bag 82. Such a cup or wrapper would protect skirt 76 and bag 82 from contamination, could enhance the barrier properties of the container and would provide a convenient surface upon which a label could be printed. Alternately, the container 70 could be itself contained within a sealed bag to obtain the above-described enhancements.

In order to use the food preparation system 10, the inner cup 42 will be inserted into the outer cup 12. Next, the prescribed amount of liquid necessary to mix with the foodstuff 84 will be poured into the inner cup 42. Next, the food container 70 is inserted into the inner cup 42 such that the lip 54 thereof supports flange 74 of food container 70. The food container 70 is positioned such that cut-out 90 is disposed under discharge tube 64. For example, the food container 70 may be placed within the inner cup 42 in a manner whereby the discharge tube 64 pierces the perforated cut-out 90 thereby opening the same. By opening the cut-out 90 it is possible for liquid to be added to the foodstuff 84 contained within bag 82.

In order to prepare the foodstuff 84, the outer cup 12 will be placed upon base 34 such that electrical energy will be supplied to heating element 22. The electrical energy supplied to heating element 22 will thereby heat the base portion 16 of outer cup 12. Liquid that had been poured into the interior 50 of inner cup 42 will flow into the liquid heating chamber 44 via the valve 58. The heat produced by the heating element 22 will cause the liquid to percolate or be transferred into the bag 82. Specifically, the liquid within liquid heating chamber 44 will be heated to its boiling point and will begin to vaporize thereby forming vapor bubbles 92. As the vapor bubbles 92 expand, an increase of pressure is created which forces heated liquid through groove 60 and discharge tube 64 such that the heated liquid will drain into the interior of bag 82. As previously explained, valve 58 will prevent the liquid from flowing back into the interior 50 of inner cup 42. After a short period of time, the vapor pressure in the liquid heating chamber 44 will decrease as the liquid within the groove 60 and discharge tube 64 is expelled. Accordingly, the liquid contained within interior 50 of inner cup 42 that is unheated will drain into liquid heating chamber 44. Once the liquid is within the heating chamber 44, the liquid will be heated again and forced up groove 60 and discharge tube 64, as previously described. This cycle will repeat until all of the water within interior 50 and heating chamber 44 has been heated and transferred. Once heating chamber 44 is empty of water, base portion 16 will increase in temperature and thermostat 140 will operate to disconnect power to heating element 22.

As previously mentioned, the bag 82 is folded within the support member 72. Accordingly, as the liquid contained within interior 50 of inner cup 42 is transferred into the bag 82 of food container 70 the bag 82 will expand from the force and weight of the liquid. Due to the liquid draining from interior 50 and being transferred to the food container 70, space will be created for the bag 82 to expand. Accordingly, as the liquid is being transferred into the food container 70, the bag 82 will expand and occupy the space within the interior 50 of the inner cup 42 which was previously occupied by the liquid.

Once all of the liquid has been transferred into the bag 82, the liquid is allowed to mix with the foodstuff 84 thereby preparing the same. As previously mentioned, the sealing sheet 82 prevents steam and heat from escaping the food container 70 such that the foodstuff 84 will steep with the liquid. After a prescribed period of time (i.e., usually four to seven minutes) the foodstuff 84 is ready to eat. In order to eat the foodstuff 84, the user will remove the sealing sheet 86 via tab 88. If the foodstuff 84 is in the form of a soup, the user can drink the soup directly from the container 70 by using lip 80. In this respect, lip 80 will prevent the outer surface of outer cup 12 from getting dirty such that it will not need to be cleaned. Once the user has consumed the foodstuff 84, the food container 70 can be properly disposed. The inner cup 42 can be removed from the outer cup 12 for cleaning. As will be recognized, the inner cup 42 may be placed within a dishwasher for facilitating cleaning thereof.

In further refinements of the invention, there is further provided secondary heating means to facilitate the preparation of the food stuff 84, as well as continue heating the same after the heating element 22 has been inactivated. According to one embodiment, the inner cup 12 may include a series of heating coils 94 disposed within the wall 48 of inter cup 42. The heating coils 94 are electrical heating coils such that when an electrical communication with a power source, the heating coils 94 radiate heat. Typically, the heating coils 94 may be an electrical communication with a power source through the use of contact (not shown) which allow the inner cup 42 to be removed from the outer cup 12. Additionally, if desired, the heating coils 94 may be operative to maintain the food stuff 84 at a constant temperature.

As an alternative to the foregoing, outer cup 12 may include a secondary heating element (not shown) which is operative to heat the lower portion of outer sidewall 18. A cutout (not shown) is present in the lower portion of inner cup 42 which permits a portion of bag 82 to come into direct contact with the heated portion of outer sidewall 18 of outer cup 12. Such heating element will be operative to continue heating bag 82 and foodstuff 84 after heating element 22 has been inactivated. As per the aforementioned embodiment, the secondary heating element may be used to cook foodstuff 84 and maintain foodstuff at a constant temperature. This is particularly useful when foodstuff 84 is dried pasta, rice or other substance that requires simmering for its preparation.

In either embodiment, it is contemplated that secondary heating element may be controlled using time and power controllers that produce a programmed heating cycle appropriate for foodstuff 84. Those skilled in the art will recognize that alternate embodiments may achieve a comparable effect to the heating system described herein. For example, the lower portion of inner cup 42 may be constructed of heat conductive material, thus facilitating the transfer of heat from outer sidewall 18 to bag 82. In addition, heating element 22 and secondary heating element, such as heating coils 94, may be replaced by a single heating element that is operative to heat both the bottom and the side of outer cup 12.

The food preparation system 10 may also be utilized for preparing a cup of coffee. Referring to FIGS. 5 and 6, a coffee lid 100 that is attachable to the lip 54 of inner cup 42 is shown. The coffee lid 100 has a generally circular support structure 102 and a coffee filter 104 and liner 60 attached thereto. The support structure 102 has a lower flange 106 integrally attached to a top wall 108. As seen in FIG. 5, the top wall 108 extends upwardly from the lower flange 106. The lower flange 106 is configured to attach to the lip 54 of inner cup 42. Projecting downwardly from the lower flange 106 is a skirt 110 which has a inside diameter slightly larger than the outer diameter of lip 54. In this respect, skirt 110 frictionally retains the support structure 102 on the lip 54 of the inner cup 42. Formed within the skirt 110 is a tube cut-out 112 for facilitating insertion of the support structure 102 to discharge tube 64. Formed within the top wall 108 is a funnel portion 114 which projects generally downwardly into the inner cup 42 when coffee lid 100 is attached thereon. Formed in the bottom of the funnel portion 114 is an elongate slit 116. A stir stick or similar device may extend through slit 116 into liner 160, the latter being received in the interior 50 of inner cup 42 in order to stir the contents therein. The slit 116 provides for a wide sweep of the stirring device while minimizing the potential for liquid to be spilled.

Disposed adjacent to the top wall 108 and formed on support structure 102 is a generally planer discharge tube engagement portion 118. The discharge tube engagement portion 118 is sized such that when the coffee lid 100 is attached to inner cup 42 the bottom surface of discharge tube 64 is in abutting contact with the tube engagement portion 118. Formed within the tube engagement portion 118 is a tube opening 120 which aligns with the opening 68 of discharge tube 64. Attached to a lower surface of tube engagement portion 118 is the coffee filter 104. Referring to FIG. 6, the coffee filter 104 comprises a coffee bag 122 disposed within a brewing tube 124. The coffee bag 122 contains coffee grinds 126 and is formed from a permeable material such as papers wherein fluid can flow therethrough. On the other hand, the brewing tube 124 is formed from a flexible impermeable material such as plastic film whereby fluid does not flow therethrough. The brewing tube 124 is attached to the lower side of the tube engagement portion 118 via a flange portion 128.

When inserted into the inner cup 42 and aligned with discharge tube 64, heated liquid 130 from the discharge tube 64 flows into the interior of the brewing tube 124 via tube opening 120. The liquid 130 will permeate through coffee bag 122 thereby flowing over grinds 126. The liquid 130 flowing over the grinds 126 will extract flavor therefrom and flow out of coffee bag 122 and brewing tube 124. Accordingly, the liquid 130 will empty into the liner 160 which will then fill into the interior 50 of the inner cup 42.

As seen in FIG. 6, a lower portion 132 of brewing tube 124 extends over the bottom of coffee bag 122. Accordingly, when liquid 130 is not flowing through the coffee filter 104 the lower portion 132 of brewing tube 124 tends to cover the bottom of coffee bag 122. By covering the bottom of coffee bag 122, diffusion between the liquid 130 within the liner 160 in the interior 50 of inner cup 42 and the coffee grinds 126 is inhibited. Accordingly, the coffee filter 104 may remain immersed in the liquid 130 for extended periods of time without significantly increasing the strength and/or bitterness of the coffee.

Furthermore, by attaching the brewing tube 124 in a manner whereby the hot liquid 130 must flow over the grinds 126 contained within coffee bag 122, a forced extraction of the coffee is achieved. This is advantageous over traditional coffee makers whereby the liquid may bypass the coffee grounds by flowing through the upper portion of the filter. Additionally, the forced extraction also differs from typical coffee and tea bags whereby diffusion of water through the bag wall creates an infusion to extract flavor. Accordingly, the flavor of the coffee from the coffee lid 100 will be intensified. As will be appreciated by those skilled in the art, the embodiment depicted in FIGS. 5 and 6 may be adapted for use with a conventional coffee maker whereby coffee filter 104, with coffee bag 122 and coffee grinds 126, and liner 160 are attachable to a conventional coffee pot. As will be appreciated, such device will be readily operative to function with most conventional coffee makers, and will advantageously dispense with the need to utilize conventional coffee filters that require the user to selectively measure and pour coffee grinds there into. Indeed, such device will eliminate the need to deposit filters and measure out coffee for use with the filter baskets typically associated with most conventional coffee makers. Still further, by virtue of the incorporation of a liner 160, such device will provide a method whereby coffee may be continuously made in the same pot without dirtying the same.

It will be recognized, that as explained above, coffee grinds 126 were used within coffee bag 122. However, other types of flavors, such as tea, may be used. Additionally, the present invention has been described as placing the food container 70 within the inner cup 42. However, it will be recognized that the food container 70 may be used with a conventional mug. In this respect, the food container 70 may be sized to be placed within the mouth of a mug or a coffee cup. Next, water that has been previously heated through conventional means, will be poured through the cut-out 90 into the container 70. The bag 82 will expand into the cup or mug from the addition of the water. The water will be allowed to mix with the foodstuff 84 for the prescribed period of time. Once the foodstuff 84 has mixed with the liquid, the sealing sheet 86 will be removed and the foodstuff 84 may be consumed. After consumption of the foodstuff 84, the food container 70 may be properly disposed. In this respect, the food container 70 provides a method whereby the user may have a meal without dirtying the cup or mug. Because the foodstuff 84 is contained within bag 82 while in the mug, the mug does not need to be cleaned. Therefore, the food container 70 may be purchased by the consumer without the need for the inner and outer cups 42, 12.

In addition to the foregoing, it is contemplated that other various types of heating means may be available. Specifically, a flame from a liquid fuel such as alcohol may be used to heat the base portion 16. Specifically, the liquid fuel will be placed in a container disposed under base portion 16 whereby the flame from the liquid fuel heats the base portion 16. In this respect, campers who may not be near a source of electricity, could use the food preparation system 10.

Additional modifications and improvements of the present invention may also be apparent to those of ordinary skill in the art such as adapting the heating element 22 to be operative from a 12 volt power supply of an automobile. Moreover, it is contemplated that the present invention may be utilized in a wide variety of applications beyond that of food preparation. In fact, it is contemplated that the present invention may be utilized in virtually in any application requiring the mixing of a heated diluent with a concentrated substance in order to produce a resultant mixture, and can include numerous procedures well known in the art, such as those utilized to formulate adhesives and wax-containing compounds. Thus, the particular combination of parts described and illustrated herein is intended to represent only a certain embodiment of the present invention, and is not intended to serve as a limitation of alternative devices within the spirit and scope of the invention.

What is claimed is:

1. A food preparation system, comprising:
   a vessel having a top portion and a bottom portion configured to receive a prescribed volume of liquid;
   a container comprising an expandable chamber containing a prescribed quantity of foodstuff, said container being sized to be insertable into the top of said vessel; and
   a pump in fluid communication with the liquid and the chamber of the container via a tube;
   wherein the pump is operative to transfer the liquid from the vessel into the chamber and-mix with the foodstuff such that as the liquid is transferred into the chamber, the chamber will expand from the volume of liquid into the bottom portion of the vessel.

2. The food preparation system of claim 1 wherein the pump is a percolator.

3. The food preparation system of claim 1 wherein the pump comprises a heating element in fluid communication with the liquid and the tube, the heating element being operative to heat and transfer the fluid into the chamber.

4. The food preparation system of claim 1 wherein the vessel is configured to contain water.

5. The food preparation system of claim 1 further comprising a conduit in fluid communication with the pump and the container, the conduit being configured to transfer the liquid from the pump into the container.

6. The food preparation system of claim 1 wherein the vessel defines a mouth and the container is sized and configured to engage the mouth of the vessel when inserted therein.

7. The food preparation system of claim 6 wherein the container comprises a lip engageable to the mouth of the vessel in order to facilitate cleaning of the vessel.

8. A food preparation system comprising:
   a vessel having an interior chamber;
   an inner cup insertable into the interior chamber of the vessel;
   a container having a prescribed quantity of foodstuff, the container insertable into the inner cup; and
   a pump in fluid communication with the vessel and the container, the pump being operative to transfer liquid from the vessel into the container such that the liquid is mixed with the foodstuff;
   wherein the inner cup comprises a valve such that when the inner cup is inserted into the vessel, liquid poured into the inner cup will flow into the interior chamber of the vessel.

9. The system of claim 8 wherein the container comprises an expandable interior containing the foodstuff such that as the liquid is poured into the container, the interior expands.

10. The system of claim 8 wherein inner cup has a top portion and a bottom portion and the container is placed in the top portion and expands into the bottom portion of the inner cup as liquid is pumped into the expandable interior.

11. The system of claim 8 wherein the pump comprises a heating element in fluid communication with the liquid when poured in the vessel, the heating element being operative to heat and transfer the fluid into the container.

12. The system of claim 8 wherein the pump is a percolator.

13. A method of preparing packaged food with a food preparation system having an expandable container with a prescribed quantity of foodstuff and a vessel with a pump, the method comprising the steps of:
   a) filling the vessel with a prescribed volume of liquid;
   b) inserting the expandable container into the vessel; and
   c) sufficiently heating the liquid to transfer the liquid from the vessel into the container with the pump in order to mix the liquid with the foodstuff; and
   d) expanding the container with the liquid being transferred therein by the pump.

14. The method of claim 13 wherein the vessel comprises a top interior portion and a bottom interior portion for containing the liquid, and:
   step (a) comprises pouring the liquid in the bottom interior portion;
   step (b) comprises inserting the container in the top interior portion; and
   step (d) comprises expanding the container into the bottom interior portion as the liquid is transferred from the bottom interior portion into the container.

* * * * *